United States Patent [19]
Schwab et al.

[11] Patent Number: 5,895,618
[45] Date of Patent: Apr. 20, 1999

[54] METHOD FOR EMBEDDING SEPARATED ELEMENTS IN A MOLDED MEMBER

[75] Inventors: Charles M. Schwab, Justice; Gary E. Sullo, Orland Park; Terry D. Thomason, Kankakee; Steve Paul, Lockport, all of Ill.

[73] Assignee: Illinois Tool Works Inc., Glenview, Ill.

[21] Appl. No.: 08/650,329

[22] Filed: May 20, 1996

[51] Int. Cl.⁶ .......................... B29C 33/12; B29C 45/14
[52] U.S. Cl. .................. 264/155; 264/163; 264/273; 264/272.11; 29/882; 29/883; 29/527.4
[58] Field of Search .................. 264/163, 272.11, 264/272.14, 272.15, 273, 277, 154, 155, 156, 153, 294, 296; 29/883, 884, 882, 527.4

[56] References Cited

U.S. PATENT DOCUMENTS

| | | | |
|---|---|---|---|
| 4,234,638 | 11/1980 | Yamazoe et al. | 264/273 |
| 4,829,670 | 5/1989 | Hilgers | 264/272.14 |
| 4,846,646 | 7/1989 | Magnusson | 264/163 |
| 4,956,139 | 9/1990 | Koizumi et al. | 264/273 |
| 4,965,933 | 10/1990 | Mraz et al. | 264/163 |
| 5,038,468 | 8/1991 | Wanatowicz | 264/163 |
| 5,203,060 | 4/1993 | Mraz et al. | 264/163 |
| 5,335,403 | 8/1994 | Jensen | 264/273 |
| 5,582,787 | 12/1996 | Tyner | 264/163 |

*Primary Examiner*—Angela Y. Ortiz
*Attorney, Agent, or Firm*—Schwartz & Weinrieb

[57] ABSTRACT

A method and apparatus of embedding separated elements in a molded member wherein at least one side of the separated elements is covered by the molded member. The separated elements are interconnected by links to form a unitary member, which is disposed in a mold cavity formed by first and second mold plates. A support pin positioned on a first side of the unitary member supports the unitary member while a punch pin is extended toward a second side of the unitary member and through the link interconnecting the elements so as to sever the link. At least one of the punch pins or the support pins is retracted away from at least one side of the separated elements before injecting a molten material into the cavity so as to form the molded member.

10 Claims, 2 Drawing Sheets

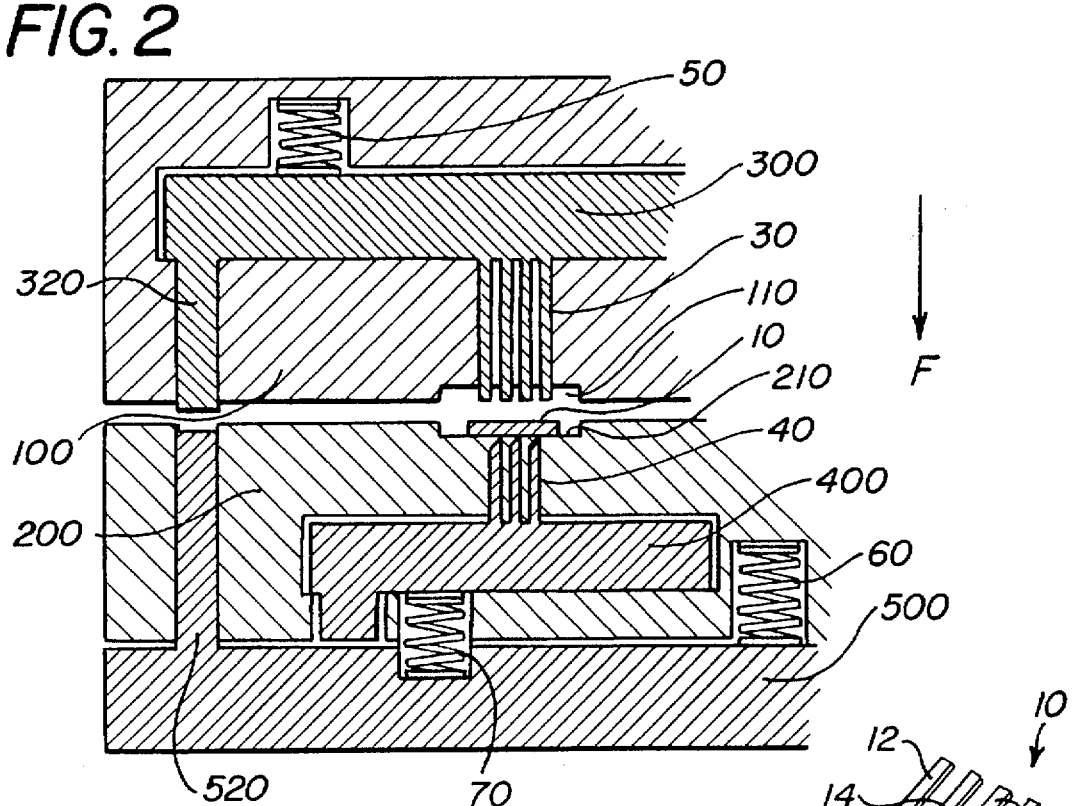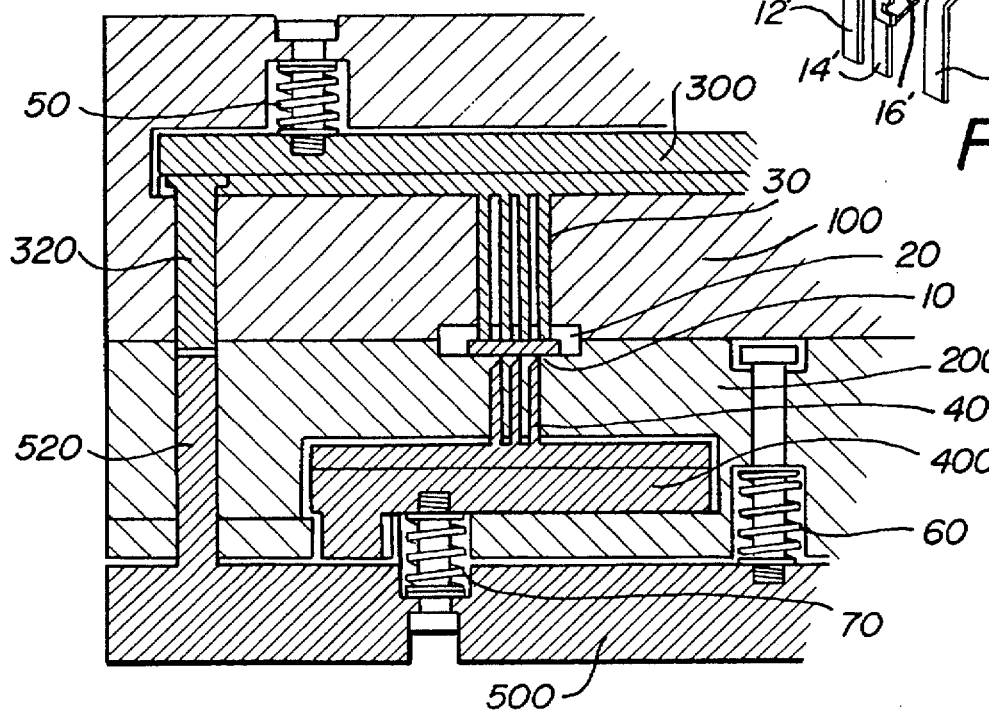

METHOD FOR EMBEDDING SEPARATED ELEMENTS IN A MOLDED MEMBER

FIELD OF THE INVENTION

The invention generally relates to a method and apparatus for embedding separated elements in a molded member, and more specifically for embedding separated conducting leads in a molded member wherein the separated conducting leads are supported by support pins and severed from a unitary member by punch pins, the punch pins and support pins being extendable into a mold cavity before injecting a molten material into the mold cavity to form the molded member.

BACKGROUND OF THE INVENTION

The formation of a molded member about an embedded or partially embedded element so as to form an integrated assembly is known and has many applications. The element is generally inserted into a mold cavity and arranged in some specified spatial configuration within the mold cavity prior to molding wherein a molten material, such as a resin based thermoplastic, is injected, compressed and allowed to harden before the integrated assembly is removed from the mold. In some applications, the embedded elements protrude from the molded member for mounting or interfacing the integrated assembly. In electrical applications for example the embedded element may be a plurality of electrically conducting elements such as metallic leads, which form a portion of an electrical circuit within the molded member. The leads may also include an exposed conducting surface for contacting a conducting wiper or a protruding lead for interfacing with an electrical system. In electrical applications, the molded member retains the electrically conducting leads in some isolated electrical circuit configuration and the insulating property of the molded member electrically insulates the isolated conducting leads from one another.

In the past, the insertion and arrangement of a plurality of elements in a mold cavity prior to injection of the molten material has been simplified by interconnecting the plurality of elements with links to form a unitary member, which is more readily inserted into and arranged within the mold cavity than are a plurality of individual elements. In electrical applications for example a plurality of electrical leads are interconnected by links to form a unitary lead frame, which may be fabricated from a sheet of conducting material in a stamping process, wherein the unitary lead frame is positioned in the mold cavity prior to molding. After the injected molten material cures or hardens, the integrated assembly is removed from the mold and further processed to separate and electrically isolate the individual leads that form the unitary lead frame. One method of separating the leads is to sever the links that interconnect the leads after the molding process with a punch, which is driven through the link and in some instances through both the link and the molded member. Another method, disclosed in U.S. Pat. No. 5,038,468 to Wanatowicz, severs the links with an arrangement of mold plates having a punch extendable toward a die after the unitary lead frame is inserted into the mold cavity but before injection of the molten material, which is injected into the cavity while the punch remains extended toward the die and in contact with the severed lead frame. Both prior art methods of separating the leads of the unitary lead frame however result in exposure of portions of the conducting leads on both opposing sides of the integrated assembly. More specifically, in the case where separation occurs after molding, a hole remains extending through the molded member and the severed unitary member exposing at least a sectional portion of the leads. In the case where separation occurs prior to molding, opposing surfaces of the lead frame are exposed by openings remaining on the molded member where the punch and die were positioned during injection of the molten material. Many applications however require that at least one side of the conducting leads, or at least an area about the severed link, be covered by the molded material to protect the conducting leads from moisture, corrosive materials such as salt and other degrading environmental hazards.

In view of the discussion above, there exists a demonstrated need for an advancement in the art of embedding elements in a molded member.

OBJECTS OF THE INVENTION

It is therefore an object of the invention to provide a novel method and apparatus for embedding elements in a molded member that overcome the problems in the prior art.

It is another object of the invention to provide a novel method and apparatus for embedding elements in a molded member that is economical, effective and reliable.

It is also an object of the invention to provide a novel method and apparatus for embedding separated elements, which may be electrically conductive elements, in a molded member wherein at least one side of the separated elements is covered by the molded member.

It is a further object of the invention to provide a novel method and apparatus embedding separated elements in a molded member wherein the separated elements are supported by support pins and severed from a unitary member in a mold cavity by punch pins and wherein at least one of the sets of punch pins and support pins is retractable from the mold cavity before injecting a molten material into the mold cavity to form the molded member.

Accordingly, the invention is drawn to a method and apparatus for embedding separated elements in a molded member wherein at least one side of the separated elements is covered by the molded member. The elements are severed from a unitary member disposed in an open mold cavity formed by first and second mold plates wherein the unitary member includes at least two elements interconnected by a link. A support pin positioned on a first side of the unitary member supports the unitary member while a punch pin is extended toward a second side of the unitary member and through the link interconnecting the elements. At least one of the punch pins or the support pins is retracted away from at least one side of the separated elements before injecting a molten material into the cavity to form the molded member.

In one embodiments the support pin protrudes from a support pin plate and extends through the first mold plate into the mold cavity wherein the support pin is biased toward the unitary member by a support plate spring member. A base plate coupled to the punch pin is biased away from the second mold plate to bias the punch pin out of the mold cavity and away from the unitary member. The first and second mold plates however are movable toward the base plate, which extends the punch pin through the second mold plate and through the link interconnecting the elements of the unitary member. A punch plate spring member interconnecting the punch pin and the base plate permits the first and second mold plates to move toward the base plate without further extending the punch pin into the mold cavity. A second return pin coupled to the base plate moves a first return pin coupled to the support pin plate to retract the support pin away from the severed unitary member against the bias of a support plate spring member before injecting a molten material into the cavity to form the molded member.

BRIEF DESCRIPTION OF THE DRAWINGS

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators, throughout the several views, and wherein:

FIG. 1 is a perspective view of a unitary member having at least two individual elements interconnected by a link, which in the exemplary embodiment is an electrically conductive lead frame having a plurality of conducting leads interconnected by severable links.

FIG. 2 is a partial sectional view of an open mold cavity containing a unitary member disposed on a lower mold plate wherein the sectional view of the unitary member is taken through links interconnecting its elements, which for example may be along line 2—2 of the lead frame in FIG. 1.

FIG. 3 is a partial sectional view of a closed mold cavity containing a unitary member wherein a plurality of support pins are extended into the cavity and positioned toward an upper surface of the unitary member.

DETAILED DESCRIPTION OF THE INVENTION

Figure 4:
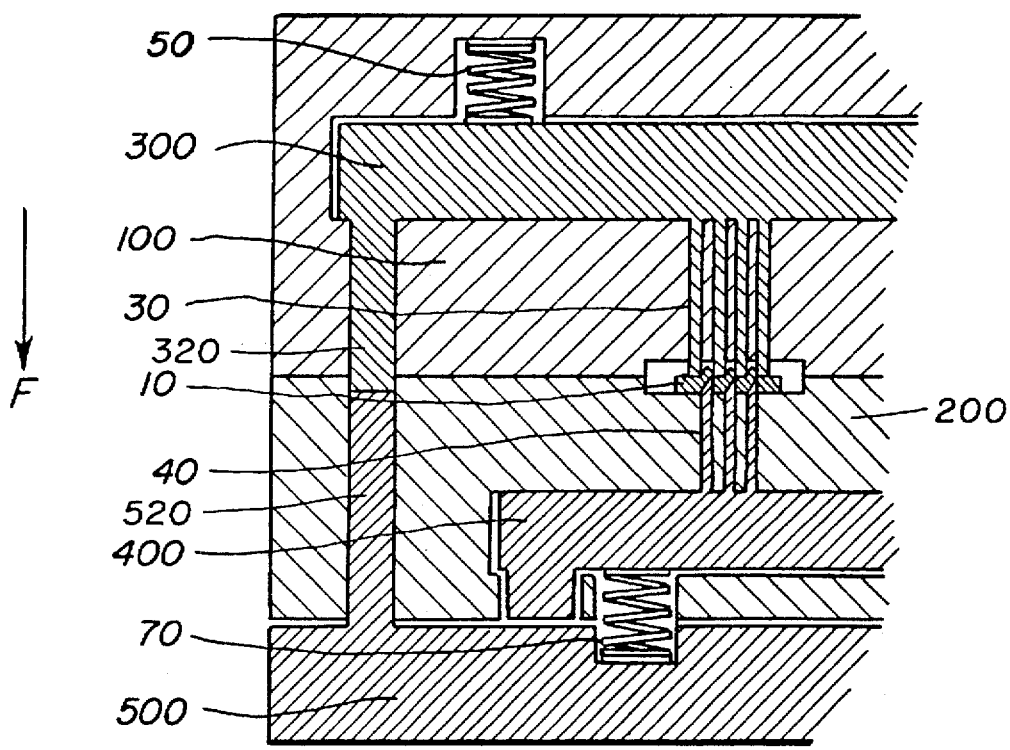
FIG. 4 is a partial sectional view of a closed mold cavity containing a severed unitary member wherein a plurality of punch pins are positioned to sever the links interconnecting elements of the unitary member.

FIG. 1 is a perspective view of a unitary member 10 having at least two individual elements interconnected by a severable link, which are embeddable in a molded member 10. In the exemplary embodiment the unitary member is an electrically conductive lead frame, having a plurality of electrically conducting leads 12, 14, 16 and 18 interconnected by severable links 13, 15 and 17, which is fabricated from an electrically conductive material. The unitary member 10 however may be formed of any elements interconnected by severable links, which are insertable into a mold cavity and embedded, in whole or part, in a molded member to form an integrated assembly. The invention therefore is not limited to embedding electrical conductors in a molded member, but to embedding any elements that are separable from a unitary member inserted into a mold cavity before injecting a molten material into the mold cavity.

According to the invention, a unitary member, such as the lead frame 10, is inserted into a mold cavity formed by first and second mold plates, which are movable relative to each other to open and close the mold cavity. One or more support pins are extendable into the mold cavity toward a first side of the unitary member, and one or more punch pins are extendable into the mold cavity toward a second, opposing side of the unitary member. The punch pins are extended through the links interconnecting the elements of the unitary member so as to separate the elements while the support pins support the unitary member. In the exemplary embodiment, each punch pin severs a link from an adjacent element and bends the severed link away from the severed element without leaving any waste material such as a plug in the mold cavity. After the unitary member is severed into the desired number of separated elements, either the support pins or the punch pins are retracted away from at least one side of the severed unitary member before injecting a molten material into the mold cavity to form the molded member, which covers the severed link separating the elements on at least one side of the severed unitary member.

In one embodiment, the support pins are retracted away from the first surface of the severed unitary member before injecting the molten material into the mold cavity so that the first side of the severed unitary member is covered with the molded member. In an alternative embodiment, the punch pins are retracted away from the unitary member so that the second side of the severed unitary member is covered with the molded member. In yet another embodiment, both the support pins and the punch pins are retracted away from the severed unitary member before injecting the molten material into the mold cavity so that both the first and second sides of the severed unitary member are covered with the molded member. The unitary member may be suspended away from interior surfaces of the mold cavity by appendages, which ultimately protrude from the molded member, disposed in corresponding recesses in the mold plates so as to permit molten material to substantially surround the severed unitary member.

FIGS. 2 through 5 show a partial sectional view of an apparatus in different stages of operation for embedding separated elements in a molded member according to an exemplary embodiment of the invention. The apparatus includes a first mold plate 100 with a partial mold cavity 110 on a first surface and a second mold plate 200 with a partial cavity 210 on a second surface. The first and second mold plates 100, 200 are movable toward each other so as to form a closed mold cavity wherein a molten material is injected to form the molded member, not shown in the drawing, and movable away from each other so as to open the mold cavity for removing the molded member. Movement of the first and second mold plates 100, 200 is performed by hydraulic or mechanical cam actuators not shown in the drawing. FIGS. 2 through 5 show the unitary member 10 inserted in the open mold cavity so that the sectional view of the unitary member 10 is taken along or through the links interconnecting the elements to be separated, which is for example taken along the line 2—2 in FIG. 1. The unitary member 10 may be positioned on either mold plate 100, 200 or suspended between the mold plates 100, 200 as discussed above. In the exemplary embodiment, the unitary member 10 is disposed on the lower mold plate 200 and positioned in the mold cavity by extending flange portions 12', 14' and 18' of the elements into corresponding recesses in the lower mold plate 200 not shown in the drawing. In another embodiment, a differential pressure resulting from the injected molten material will adhere the separated elements on a surface of the mold plate without anchoring appendages in recesses of the mold plates to cover at least one side of the separated elements.

Figure 5:
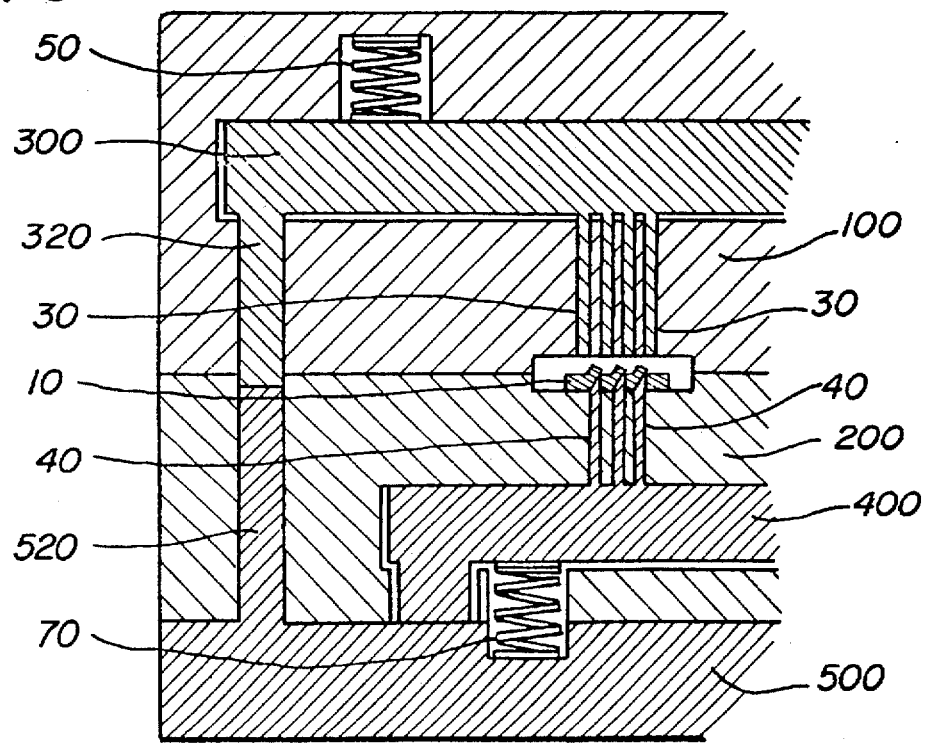
FIG. 5 is a partial sectional view of a closed mold cavity containing a severed unitary member wherein the support pins are retracted from the cavity before injection of the molten material into the cavity, which forms a molded member about the separated elements.

FIG. 3 shows the first and second mold plates 100, 200 moved toward each other so as to form a closed mold cavity 20, and one or more support pins 30 extendable through the first mold plate 100 and into the mold cavity 20 toward a first side of the unitary member 10. One or more punch pins 40 are extendable through the second mold plate 200 and into the mold cavity 20 toward a second side of the unitary member 10 for severing the links interconnecting the elements of the unitary member 10. The punch pins 40 have a bevelled knife edge surface that severs the unitary member 10 without leaving plugs or waste in the mold cavity 20. There is one punch pin 40 for each link to be severed, and in the exemplary embodiment there is also provided a support pin 30 for supporting the opposite side of each link during the separating or severing step. The severed links are bent away from the severed element by the punch pin 40 so as to provide a space between separated elements, which may be filled with molten material to provide additional support and electrical insulation. FIG. 4 shows the punch pins 40 extended into the cavity 20 and through the links interconnecting the elements when the support pin is extended toward the first side of the unitary member 10 for separating the elements from one another. Either the support pins 30 or the punch pins 40 are retractable away from the separated elements of the severed unitary member 10 before injecting a molten material into the mold cavity 20 to form the molded member. FIG. 5 shows retraction of the support pins 30 before injection of the molten material, which permits molten material to flow over and cover the first side of the severed unitary member 10 including the severed link separating the elements. The bent portion of the link has an anchor effect that facilitates embedding the elements in the molded member. In embodiments where the unitary member is suspended in the mold cavity, both the support pins 30 and punch pins 40 may be retracted after separating the elements but before injecting the molten material to permit the molten material to flow over and cover the both sides of the severed unitary member.

In the exemplary embodiment of FIGS. 2–5, the support pins 30 are coupled to a support pin plate 300, which is movable to extend and retract the support pins 30 into and out of the mold cavity 20. A support plate spring member 50 acting on the support pin plate 300 biases the support pins 30 to extend through the first mold plate 100 and into the mold cavity 20. The punch pins 40 are coupled to a punch pin plate 400, which is movable to extend and retract the punch pins 40 into and out of the mold cavity 20. A base plate 500 is coupled to the punch pin plate 400, and the base plate 500 is movable relative to the first and second mold plates 100 and 200. The base plate 500 is also biased away from the second mold plate 200 by a base plate spring member 60, shown in FIGS. 2 and 3, which also biases the punch pins 40 away from the mold cavity 20. In the exemplary embodiment, the base plate 500 is fixed and an actuator acts on the first mold plate 100 in the direction of arrow F toward the second mold plate 200 to close the mold cavity 20 as shown in FIG. 3. Further movement of the first mold plate 100 in the direction of arrow F moves both the first and second mold plates 100, 200 toward the base plate 500 against the bias of the base plate spring member 60, which results in extension of the punch pins 40 into the mold cavity 20 toward the second side of the unitary member 10 and through the links 15, 13 and 17 so as to separate the elements of the unitary member 10 as shown in FIG. 4. As the punch pins 40 contact the second side of the unitary member 10 so as to sever the links, the support pins 30 remain biased toward the first side of the unitary member 10 by the support spring member 50 to support the unitary member during the separating step.

A punch plate spring member 70 couples the punch pin plate 400 to the base plate 500 to permit movement of the first and second mold plates 100, 200 toward the base plate 500 after the punch pins 40 have severed the unitary member without further extension of the punch pins 40 into the mold cavity 20. A first return pin 320 is coupled to the support pin plate 300 and a second return pin 520 is coupled to the base plate 500. As the first and second mold plates 100 and 200 are moved toward the base plate 500 in the direction of arrow F after the punch pins 40 have severed the unitary member 10, the second return pin 520 acts on the first return pin 320 so as to move the support pin plate 300 and the support pins 30, against the bias of the support plate spring member 50, which retracts the support pins 30 through the first mold plate 100 and away from the first side of the severed unitary member 10 as shown in FIG. 5. The first side of the severed unitary member 10 is thereby unobstructed by the support pins 30 so as to permit the injected molten material and subsequently formed molded member to cover the first side of the separated elements. In electrical applications, the molten material may also flow between the separated elements of the severed unitary member to provide additional support and improved electrical insulation between the separated elements.

FIG. 3 is a diagrammatic illustration of a more practical construction of the exemplary embodiment discussed herein, which shows component parting lines of first and second mold plate assemblies, a support pin plate assembly, a punch pin plate assembly and shoulder bolts for retaining the spring members. In addition, the apparatus more generally comprises a plurality of mold cavities formed in the first and second mold plates and corresponding punch pins and support pins. Additional spring members are also contemplated as required to provide evenly distributed biasing forces that function as discussed above.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A method of embedding separated elements in a molded member, comprising the steps of:

providing a mold cavity formed by a first mold plate and a second mold plate;

disposing said first and second mold plates away from each other so as to define an open mold cavity;

disposing a unitary member, comprising at least two elements interconnected together by means of a link, in said open mold cavity;

closing said open mold cavity so as to enclose said unitary member;

supporting said unitary member within said mold cavity by support means disposed upon a first side of said unitary member;

disposing punch means upon a second side of said unitary member;

extending said punch means within said mold cavity toward said second side of said unitary member and through said link interconnecting said at least two elements while said support means supports said first side of said unitary member within said mold cavity so as to sever said unitary member into at least two separate elements;

retracting at least one of said punch and support means away from at least one side of said severed unitary member and with respect to said mold cavity, while said severed unitary member is still disposed within said mold cavity, and before injecting a molten material into said mold cavity so as to form a molded member; and injecting molten material into said mold cavity so as to cover at least one side of said severed unitary member comprising said at least two separated elements with molten material so as to form a molded member having said at least two separated elements embedded therein.

2. The method as set forth in claim 1, further comprising the steps of:

forming said support means as at least one support pin; and integrally mounting said at least one support pin upon a support pin plate.

3. The method as set forth in claim 2, further comprising the steps of:

forming said punch means as at least one punch pin; and integrally mounting said at least one punch pin upon a punch pin plate.

4. The method of claim 3, further comprising the steps of:

biasing said support pin plate toward said first mold plate and thereby causing said at least one support pin of said support pin plate to be extended through said first mold plate and into said mold cavity toward said first side of said unitary member;

retracting said at least one support pin away from said first side of said unitary member before injecting said molten material into said mold cavity so as to form said molded member; and covering said first side of said severed unitary member with said molten material so as to form said molded member.

5. The method of claim 4, further comprising the steps of:

providing a base plate;

operatively connecting said punch pin plate to said base plate;

biasing said second mold plate away from said base plate; and moving said first mold plate and said second mold plate toward said base plate and said punch pin plate so as to extend said at least one punch pin of said punch pin plate through said second mold plate and through said link interconnecting said at least two elements of said unitary member.

6. The method of claim 5, further comprising the steps of:

providing said support pin plate with a first return pin;

providing said base plate with a second return pin;

biasing said punch pin plate away from said base plate; and moving said first mold plate, said second mold plate, and said punch pin plate toward said base plate so as to cause said second return pin of said base plate to move said first return pin of said support pin plate, and said support pin connected thereto, away from said first mold plate and thereby retract said at least one support pin of said support pin plate away from said first side of said severed unitary member after said at least one punch pin has been extended through said link interconnecting said at least two elements.

7. The method as set forth in claim 4, further comprising the steps of:

mounting said at least one support pin upon a first surface of said support pin plate which is adapted to engage a first portion of said first mold plate when said support pin plate is biased toward said first mold plate; and interposing a support plate spring member between a second portion of said first mold plate and a second surface of said support pin plate for biasing said support pin plate toward said first portion of said first mold plate.

8. The method as set forth in claim 5, further comprising the step of:

interposing a base plate spring member between said second mold member and said base plate for biasing said second mold plate away from said base plate.

9. The method as set forth in claim 6, further comprising the step of:

interposing a punch plate spring member between said punch pin plate and said base plate for biasing said punch pin plate away from said base plate.

10. The method as set forth in claim 1, further comprising the steps of:

providing said unitary member as an electrically conductive lead frame; and said severance of said unitary member into said at least two separate elements comprises forming said at least two separate elements into separate electrically conductive leads.

* * * * *